US008019855B2

(12) United States Patent
Han et al.

(10) Patent No.: US 8,019,855 B2
(45) Date of Patent: Sep. 13, 2011

(54) METHOD AND APPARATUS INTERFACING BETWEEN AN APPLICATION AND A LIBRARY OF A MASTER FOR NETWORK MANAGING

(75) Inventors: Sun Mi Han, Seoul (KR); Sang Kyun Lee, Seoul (KR); Jin Sung Park, Seoul (KR); Jun Hyung Park, Kyunggi-do (KR)

(73) Assignee: LG Electronics Inc., Seoul (KR)

( * ) Notice: Subject to any disclaimer, the term of this patent is extended or adjusted under 35 U.S.C. 154(b) by 449 days.

(21) Appl. No.: 11/315,539

(22) Filed: Dec. 21, 2005

(65) Prior Publication Data

US 2006/0161893 A1 Jul. 20, 2006

(30) Foreign Application Priority Data

Dec. 22, 2004 (KR) .................. 10-2004-0110720
Dec. 22, 2004 (KR) .................. 10-2004-0110725
Dec. 22, 2004 (KR) .................. 10-2004-0110726
Dec. 22, 2004 (KR) .................. 10-2004-0110727

(51) Int. Cl.
*G06F 15/173* (2006.01)

(52) U.S. Cl. ................... 709/224; 455/151.1

(58) Field of Classification Search .......... 455/461, 455/402; 709/220–229
See application file for complete search history.

(56) References Cited

U.S. PATENT DOCUMENTS

| 4,418,333 A * | 11/1983 | Schwarzbach et al. .. 340/310.11 |
| 2002/0069220 A1* | 6/2002 | Tran .............................. 707/503 |
| 2002/0111698 A1* | 8/2002 | Graziano et al. ................ 700/17 |
| 2003/0093769 A1* | 5/2003 | Kumar .......................... 717/108 |
| 2004/0059963 A1* | 3/2004 | Simonnet et al. ............... 714/47 |
| 2004/0139018 A1* | 7/2004 | Anderson et al. ............... 705/41 |

* cited by examiner

*Primary Examiner* — Rafael Pérez-Gutiérrez
*Assistant Examiner* — Marcos Batista
(74) *Attorney, Agent, or Firm* — Lee, Hong, Degerman, Kang & Waimey

(57) ABSTRACT

The present invention relates to method and apparatus for interfacing for controlling a device between various applications operated on a home network and a library to ensure their compatibility. An interfacing method according to the present invention discloses processes to initialize a library being executed in a device for managing a home network, to set a home code for managing a home network exclusively, to manage address of each device on a home network, and to set conditions necessary for device monitoring.

6 Claims, 8 Drawing Sheets

METHOD AND APPARATUS INTERFACING BETWEEN AN APPLICATION AND A LIBRARY OF A MASTER FOR NETWORK MANAGING

Pursuant to 35 U.S.C. §119(a), this application claims the benefit of earlier filing date and right of priority to Korean Patent Application Nos. 10-2004-0110720, 10-2004-0110725, 10-2004-0110726, 10-2004-0110727, filed on Dec. 22, 2004, respectively, the contents of which are hereby incorporated by reference herein in their entirety.

BACKGROUND

1. Field

The present invention relates to a method and apparatus for interfacing between programs such as control applications executing on a home network server and a library for accessing remote devices.

2. Description of the Related Art

As the number of electronic appliances used in a home increases, the need for an effective method for controlling the electronic appliances in a centralized manner is also increasing. As a result, home networks based on LAN or power line communications are proposed.

The electronic appliances existing on a home network may be manufactured by different manufacturers. If manufacturers are different, libraries that come with electronic products for supporting access to home networks can also be different. Different libraries require different interfacing with application programs such as control programs.

If interfacing methods are different, compatibility of application programs is not guaranteed because applications can only execute on devices having the specific library on which the applications are based. As a consequence, the library developer is one factor that should be considered when application programs are purchased.

SUMMARY OF THE INVENTION

It is an object of the present invention to provide a standard interfacing method and apparatus that guarantees compatibility between various applications and libraries for home networks.

The present invention provides a driving procedure between an application and library of a home network master (server).

The present invention provides a method and apparatus for setting a home code, which is a unique identifier of a network, when a home network is set up.

The present invention provides a method and apparatus for setting or modifying an address of a home network device.

The present invention provides a method and apparatus for setting operation options of a home network device (e.g., alive status reporting period, time, event reporting activation, etc).

In a method in which an application starts in a device for managing a network according to the present invention, the application requests initialization to a library in the device, requests the library to obtain list of devices connected to the network and information on the devices, and requests the library to register an event, which is generated on a device on the network, and a call-back function to handle the event.

A method for setting a network according to the present invention transmits an arbitrary broadcast message over the network, and determines whether either initial setup of the network or adding of a device is to be conducted, based on whether there is a response to the arbitrary broadcast message. If it is determined that initial setup of the network is to be conducted, the present method commands a network adaptor to create a home code, transmits an arbitrary broadcast message, and checks whether there is a response to the broadcast message. Afterwards, if there is no response to the transmitted broadcast message the present method broadcasts a command message for setting the home code over the network.

In a method for initializing devices on a network for alive-state monitoring, an application calls a function of a library for setting a time with an input argument carrying time information, the time information being used to determine whether a device is alive or not, and the library transmits a first message to devices connected to the network, the first message commanding the devices to send a second message to notify alive periodically at an interval that is specified by the time information.

In a method for setting present time to devices on a network, an application calls a function of a library for setting present time with an input argument carrying information on present time, and the library transmits a message including the information on present time to devices connected to the network, the message commanding the devices to set present time with the information.

In a method for controlling event report of devices on a network, an application calls a function of a library for setting event reporting action to active/inactive with an input argument carrying a value indicative of active or inactive, and the library transmits a message to at least one device connected to the network, the message commanding the at least one device to set event reporting action to one state of active and inactive, the one state being specified by the value carried by the input argument.

A method for allocating an address to a device on a network receives a first message informing that a first device is connected to the network, searches a database for an unassigned address, transmits a second message commanding to set the unassigned address to the first device, and changes the unassigned address to assigned one if success of address setting is responded from the first device. If the second device exists on the network the present method transmits a third message commanding to update another database to a second device that manages the another database.

DETAILED DESCRIPTION OF THE PREFFERRED EMBODIMENT

In order that the invention may be fully understood, preferred embodiments thereof will now be described with reference to the accompanying drawings.

Figure 1:
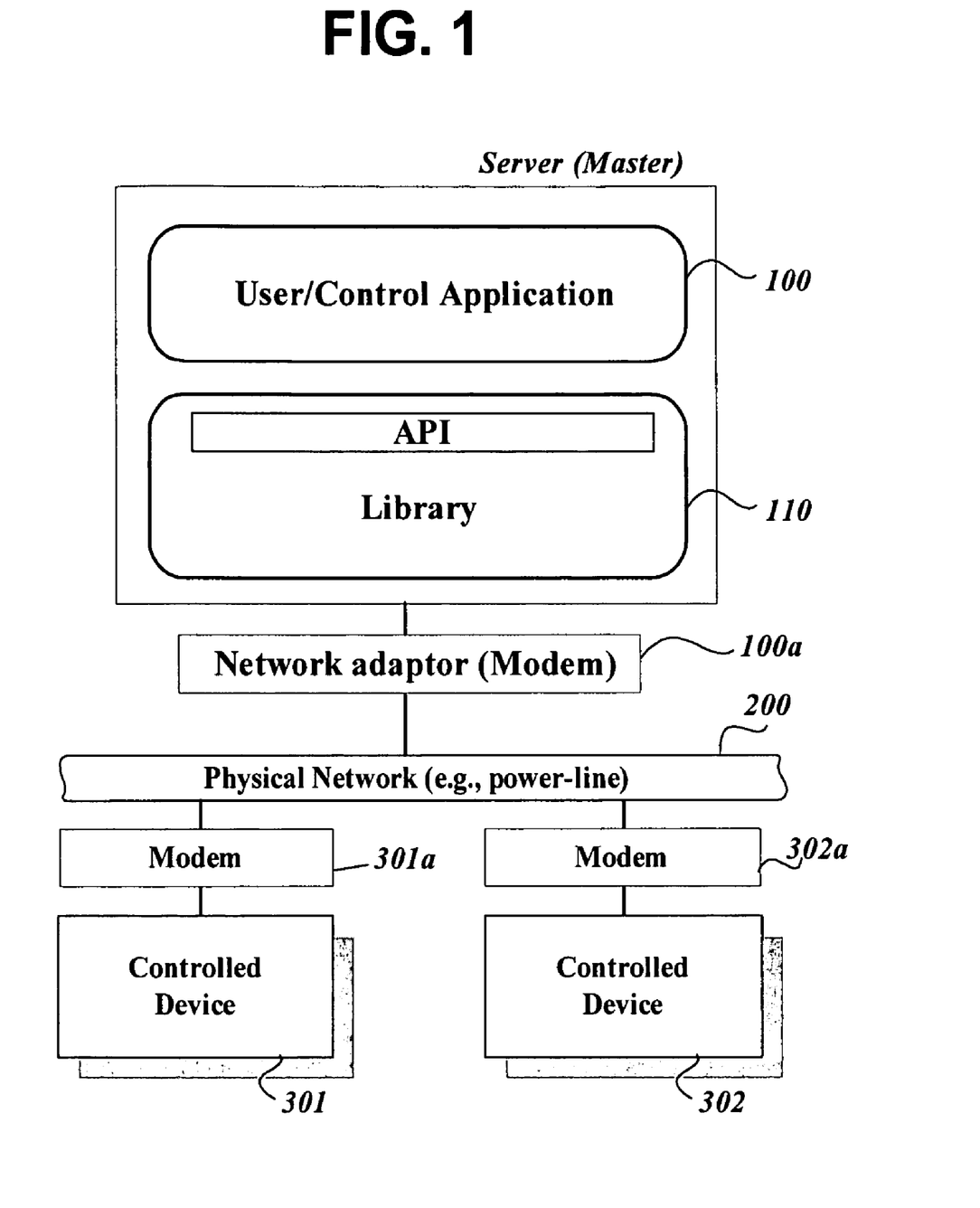
FIG. 1 illustrates a brief diagram of a home network in which the present invention may be advantageously embodied.

FIG. 1 is a brief diagram showing a home network comprising a server and controlled devices in accordance with the present invention.

The server in accordance with the present invention comprises a user application 100 (e.g., a home network management program), a library 110 including functions and execution routines required for accessing a home network, and a network adaptor 100 for accessing a physical network 200 (e.g., power lines or LAN cables). The library is also called LnCP (living network control protocol) library. The home network shown in FIG. 1 includes remote devices 301 and 302 controlled by the server. The state of the devices is monitored, modified, and/or controlled by the execution routines of the library 110. Commands for such operations are called by the user application 100 (referred to as control application hereinafter) via the API defined by the library 110, which will be described in detail.

First, the method in which the server finds active devices on the home network is described.

To obtain the list of devices connected to the home network, the control application 100 calls the following function of the library 110
    get_active_device_list(&active_device_list).

The library 110 then passes the information on the active devices on the home network via the input argument (i.e., active_device_list). The information includes the total number of active devices and a list of devices. Information on each device entry on the list is defined as follows:

```
typedef struct device {
    device_descriptor_t dd;
    device_type_t device_type;
    device_mode_t device_mode;
} device_t.
```

The information on each device includes device descriptor information, and device type and mode and it may further include protocol index. The type specifies the type of the device (e.g., refrigerator or washing machine). The mode indicates whether the device is a master or a slave.

When passing the information on active devices to the control application 100, the library 110 allocates its internal memory for each active device.

If the active devices are not used any more, the control application 100 removes the list of active devices to release the memory allocated for the active devices by calling the following function
    release_active_device_list(&active_device_list).

The following description elaborates the way in which the server obtains more detailed information on an active device existing on the home network.

The control application 100 can obtain more detailed information on a device by calling the following function
    get_device_info_by_dd(device_descriptor_t dd, device_info_t*ret_entry),
    wherein 'dd' is a device descriptor that uniquely identifies the device on the home network. Detailed information on the device specified by 'dd' is returned by the library 110 via the input argument ret_entry, which is a pointer to a data structure defined as

```
typedef struct device_info{
    device_descriptor_t      dd;
    unsigned short           address;
    device_type_t            device_type;
    char   model[MAX_MODEL_NAME_LEN];
    unsigned char            location;
} device_info_t;
``` wherein 'address' is a value obtained by a combination of the type and serial number of the device, 'model' is a text describing the model name, and 'location' is information indicative of the physical location of the device (e.g., living room or bed room).

After obtaining information on a specific device in the aforementioned way, the control application 100 calls appropriate functions of the library 110 to execute user-required commands. If it is determined that the obtained information is not necessary, the control application 100 calls a function of the library 110 to release the memory that the library 110 allocated for the device, thereby allowing the memory to be used for other purposes.

The way in which the control application 100 deals with the case where a device is removed from the home network will now be described.

The control application 100 registers the event that occurs when a device is removed (i.e., device removal event) and the callback function to be executed when the event occurs in the library 110 by calling the following function:
    add_sys_event_func_entry(EVT_SYSTEM_PLUG_OUT, plugout_event_handler).

If an event of EVT_STSTEM_PLUG_OUT (value assigned to plug-out event) occurs on the home network, the library 110 executes the registered callback function (plugout_event_handler). In this case, the library 110 passes the device descriptor or protocol index value to the callback function via the input argument dd, i.e., the library 110 calls the following function
    plugout_event_handler (sys_event_value_t dd),
    which removes the specified device from the list of active devices.

If the control application 100 does not want to receive the device removal event after the removal event is registered in the library 110, the control application 100 removes the registered event and callback function by calling the following function
    del_sys_event_func_entry(EVT_SYSTEM_PLUG_OUT, plugout_event_handler),
    wherein the event and the callback function to be removed are given as the input arguments to the function.

The function del_sys_event_func_entry( ) of the library 110 deletes the event and the callback function given by the input argument from a table of system event handlers to remove the registered the plugout_event handler function.

When a device that was registered on the network but has not been connected to the network is connected to the network again, the device can be added in much the same way as the device removal event and its associated callback function are registered. In this case, however, the event is not EVT_SYSTEM_PLUG_OUT but EVT_SYSTEM_ACTIVE_DEVICE_ADD and the associated callback function notifies the user that the device is added or executes required tasks to add the device.

For a normal operation of the control application and library in the server shown in FIG. 1, function calls and information exchange between the control application 100 and the library 110 should be conducted according to a predefined procedure.

Figure 2:
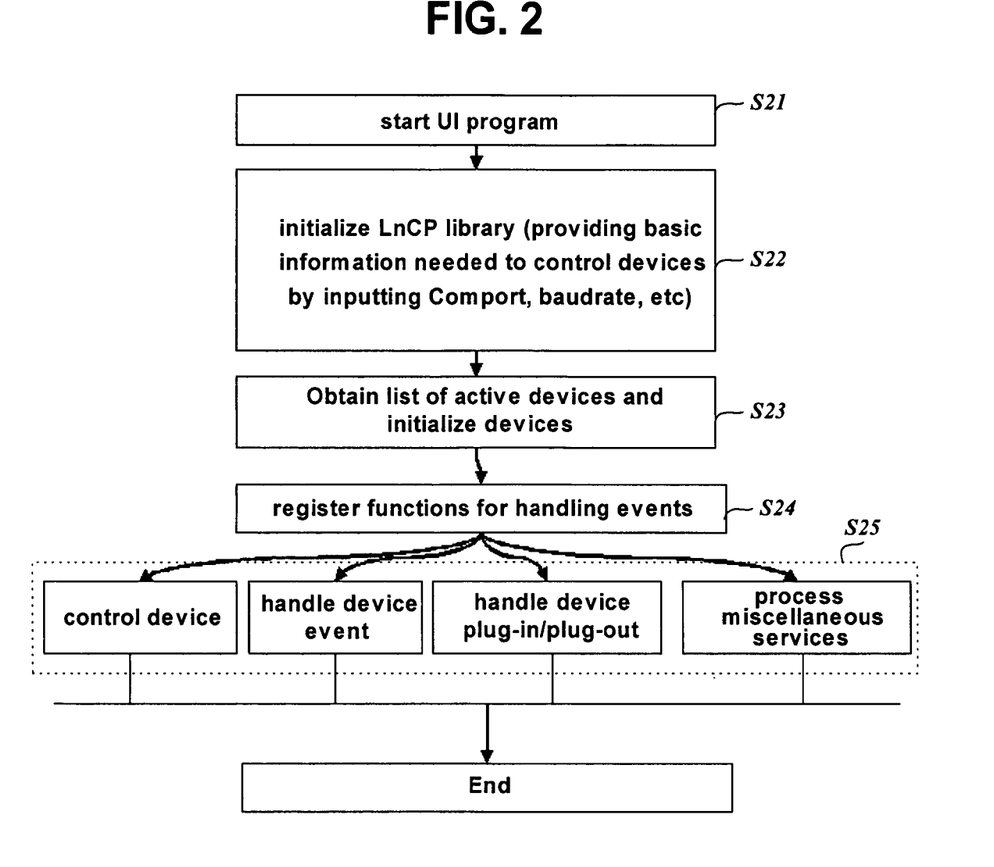
FIG. 2 illustrates a flow diagram showing the steps executed during startup of the devices shown in FIG. 1.

FIG. 2 is a flow diagram showing the required procedure. When executed, the control application 100 first loads the user interface (S21). The loading of the user interface is not necessarily to be conducted first if it is conducted at appropriate stage. The user interface may not be loaded at initial booting stage.

The control application 100 makes a request for initialization of the library 110 (S22). Information (e.g., communication port, port baudrate, etc.) on the devices to be controlled is passed to the library 110 when the request is made. The control application 100 then finds active devices and obtains information on each active device (e.g., manufacturer, product name, model number, etc.) to manage as initial information of each device (S23). Subsequently, the control application 100 registers events (e.g., plug-in event or plug-out event) and event handlers (callback functions) to handle the events (S24). When a system event occurs after all the necessary steps are completed, the LnCP library 110 calls the callback function associated with the registered system event to deal with the event (S25).

If necessary, the control application 100 may remove a registered event and its callback function by calling function to remove.

The method for notifying changes in device status will now be described. Devices supporting access to a home network are equipped with the function of generating status events when the status of the device changes (e.g., changes in power status, operation status, operating temperature, operating mode, selected course, etc). Status events are divided into 5 categories according to the cause of the occurrence of the events, which are user events that occurs when the user makes a request to a device via keys, etc, periodic events that occurs periodically (e.g., receipt of periodic alive notification message), status-changed events that occur when the status of a device (e.g., temperature, humidity, or washing course) changes, error events that occur in the case of errors in a device, and external events that occur at the request of external devices such as web servers (e.g., communication requests from remote devices when a network manager works as the home server).

Events allow efficient and convenient management of devices in that users are notified of changes in the home network status automatically without the need for requesting the status of the home network. Events are especially useful in the case of a malfunction or operation error of a device in which case the error can be notified instantaneously via events.

When a device generates an event, the device passes an event code for indicating the type of the event and an event value, which is the value of the status at which the event is generated.

To handle generated events, the control application 100 first registers the event callback function to deal with the event. There are two types in dealing with events. One type is that one callback function deals with only one event and the other type is that one callback function handles every event.

In the case where one callback function handles only one event, the control application 100 registers the callback function defined as
  typedef void(*user_event_func_t) (event_value1_t event_value)
along with device descriptor 'dd' and event code 'ec' in the library 110 by calling the function
  int add_event_handler(device_descriptor_t dd, event_code_t ec, user_event_func_t uefunc),
where 'ec' is the event type that the library 110 will report and 'uefunc' is the pointer to the callback function.

The library 110 registers the input arguments as linked each other to the function in a hash table. If a packet is parsed by an event processing module, the library 110 examines if there is an error in the parsed packet. If there is no error, the library 110 determines if the packet is an event packet.

Figure 3A:
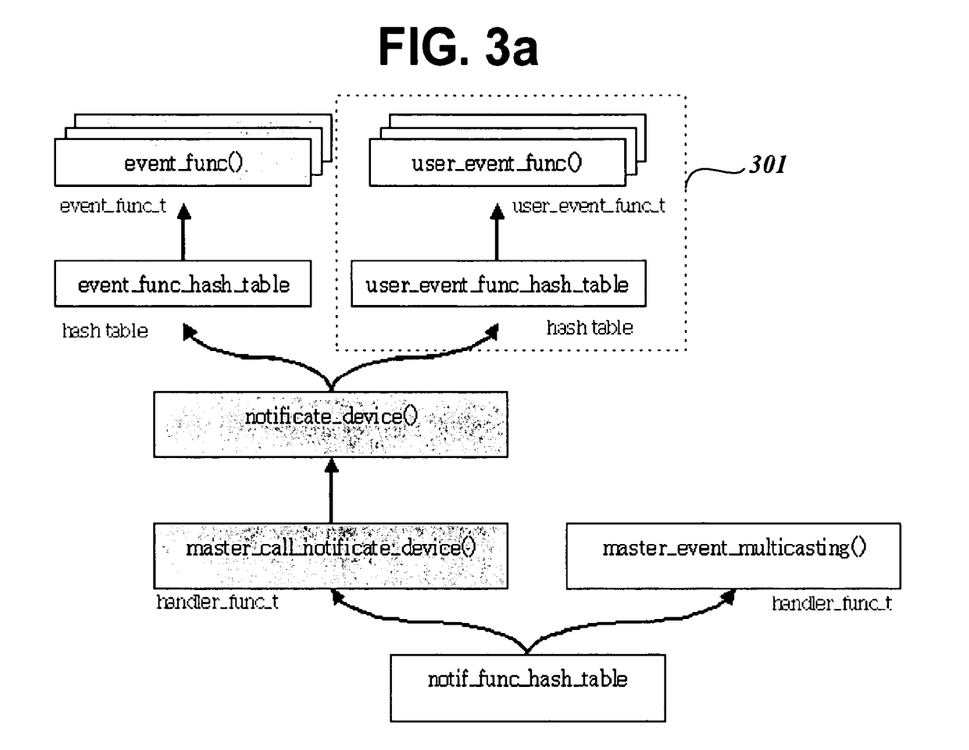
FIG. 3a illustrates a flow diagram showing the procedure for the library in FIG. 1 to handle events individually.

If it is determined that the packet is an event packet, the library 110 searches its hash table for the device descriptor and event code associated with the event based on the information on the device that generated the event and the event code and calls the associated callback function using the registered function pointer uefunc (301 in FIG. 3a). When calling the callback function via 'uefunc', the library 110 passes 'event_value' as the input argument to the function. 'event_value' is the value of the status at which the event is generated. The control application 100 notifies the user of the occurrence of the event or performs predefined operations depending on the value.

In the case where one event handler handles every event, the control application 100 registers the callback function defined as
  typedef void (*user_all_event_func_t) (unsigned short device_addr, unsigned char size, unsigned char*event_data)
  in the library 110 by calling the function
  int add_all_event_handler(user_all_event_func_t func).

The hash table in which the callback function that handles every event is registered may be different from the hash table in which callback functions that handles only one event are registered.

Figure 3B:
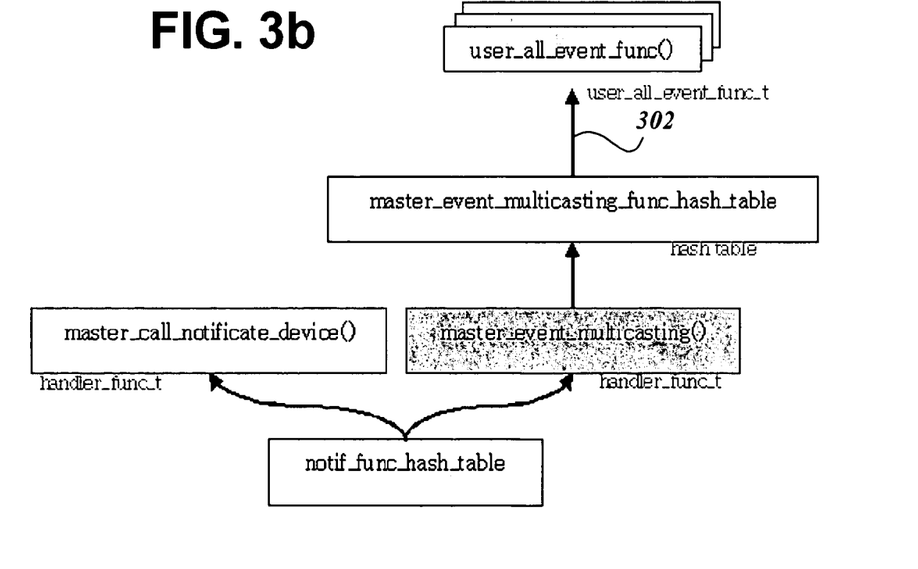
FIG. 3b illustrates a flow diagram showing the procedure for the library in FIG. 1 to handle events in an integrated manner.

Once the callback function is registered in the library 110, the library 110 always executes the callback function via function pointer 'func' whenever an event is generated by a device on the network (302 in FIG. 3b). When calling the callback function, the library 110 provides 'device_addr' and 'event_data' as the input arguments to the callback function so that the device that generated the event and the event type can be identified. The 'device_addr' is information (e.g., type and serial number) for uniquely identifying the device on the home network. The 'event_data' is a pointer value that points to a location of the event code and value.

The called routine in the control application 100 identifies the device that generated the event based on the information passed as input arguments and handles the event accordingly.

The way in which the control application 100 controls devices individually by calling routines of the library 110 will now be described.

The control application 100 needs the following information in order to call device control functions of the library 110.

The control application 100 should know the ID of the device to control (device descriptor) and the code of the command to execute. The command code may be provided internally by the library 110. Also, the control application 100 should provide information required for device control via input arguments (e.g., POWER_ON or POWER_OFF in the case of power control of a washing machine)

When calling device control routines, it is necessary to set the command mode for specifying whether to receive acknowledgment after executing the routine (synchronous mode and asynchronous mode) and command options for specifying the maximum waiting time until the acknowledgement is received in the synchronous mode.

Figure 4:
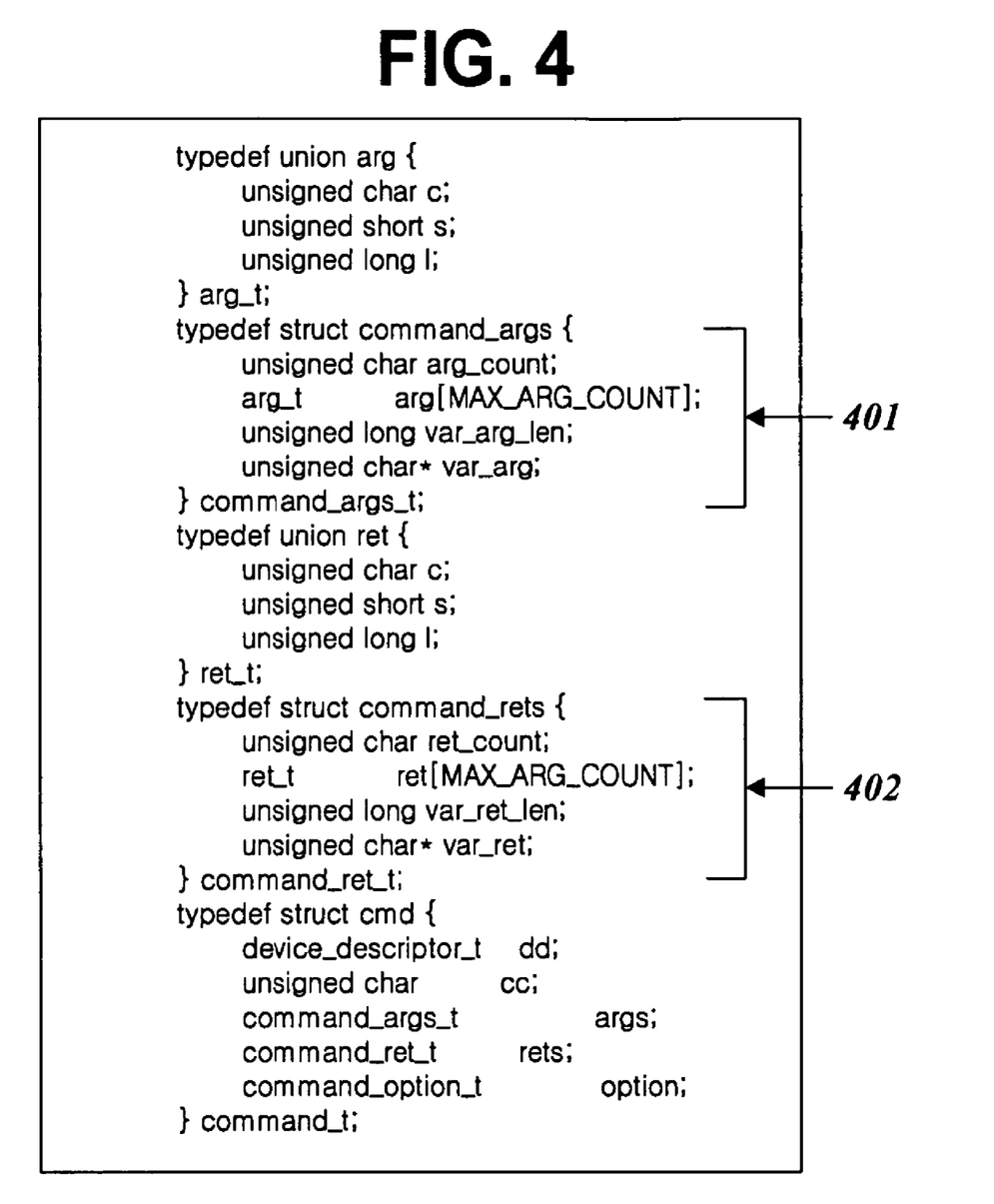
FIG. 4 illustrates the structure for commands exchanged between the application and library for monitoring/modifying/controlling home network devices individually.

In order to request control operation of a device to the library 110, the control application 100 allocates a memory space for a structure of command_t type defined in FIG. 4, puts information necessary for device control in the structure command_t, and calls a function control_device( ) of the library 110 with an input argument carrying information enabling access of the structure, e.g., a pointer of the structure.

The structure command_t defined in FIG. 4 includes variables of 'cc', 'args' of command_args_t (401) type, 'rets' of command_ret_t type (402) in which control resultant information from a device will be put, and 'option' of command_option_t type. The variables 'cc' which represents the command code, 'args' which is an array of input arguments, and 'option' are determined depending on the user input. The var_arg field in the command_args_t structure (401) and var_ret field in the command_ret_t structure (402) are pointers to the command and response, respectively.

After registering a temporary function for handling the response from a device with a key created based on the address (device_descriptor_t dd;) of the device to control and command code (unsigned cc;), which are written in the structure of FIG. 4, the called function control_device( ) generates a protocol packet to control the device and passes the protocol packet to the device 301 or 302 via the physical interface 200.

If a response and/or resultant information is received from the device or a set time is expired after the transmission of the packet, the temporary function registered to handle the response is called. Then, the temporary function sends the function control_device( ) a responding information received from a device (or time-out event) and resultant information (e.g., a value indicating whether a requested control operation is done successfully or not, a state information, etc.) that is obtained from conduction by a control request. The resultant information is not always provided from a device. If there is resultant information, the function control_device( ) puts the resultant information in the field 'rets' and returns to the control application 100 with a return value indicative of the responding information, for example, ACK or NAK for acknowledgement of the packet, or time-out of waiting time.

Then, the control application 100 examines the structure command_t to know a requested command, a device to be commanded and resultant information according to a command, and it provides the resultant information to a user in a proper manner, whereby a control operation requested from a user is finished.

The way in which the control application 100 monitors the status of individual devices by calling routines of the library 110 will now be described.

The method for status monitoring of individual devices is the same as the above method for control of individual devices through the structure command_t except for the following parts. In the event that status monitoring is conducted, the command code 'cc' included in the structure command_t has a value specifying status monitoring.

Since device monitoring functions require a response from the device as the result of the execution, the functions always operate in 'synchronous' mode and thus need to specify a timeout. The command mode and timeout are given as a command option defined as follows:

```
typedef struct command_option {
    unsigned char        async ;
    unsigned long        wait_time;   // unit: sec
} command_option_t;
```

The variable 'async' has a value of either SYNC_COMMAND or ASYNC_COMMAND (0 or 1). SYNC_COMMAND means that the control application 100 will wait for the response to the command that it issued. ASYNC_COMMAND means that the control application 100 will not wait for the response to the command.

If the variable 'async' is set to SYNC_COMMAND the same as status monitoring, the control application 100 will wait for the response during the time interval stored in the variable 'wait_time'. If a response is received before the timeout occurs, the command is completed normally. Otherwise, the control application 100 executes commands to deal with TIME_OUT event. If the variable 'async' is set to ASYNC_COMMAND, the variable 'wait_time' is simply ignored.

To allow the control application 100 and the library 110 to share the command options, a command_option_t type pointer variable may be declared as a global variable as follows:
    static command_option_t *func_option.

Because the control application 100 can call more than one function of the library 110 simultaneously, it is also possible to add a variable for storing the command code to the command_option structure as follows:

```
typedef struct command_option {
    unsigned char        ccc;           // command code
    unsigned char        async;
    unsigned long        wait_time;     // unit: seconds
} command_option_t;
```

Though a variable of the command_option_t type defined above is declared as global, the control application 100 and library 110 can execute appropriately according to synchronous or asynchronous mode because the code of the command to be executed is contained in the structure.

The method to initialize the home network and to modify settings will now be described in detail. The initialization method will be described first.

To construct a home network, a home code is used. The home code is a unique code that identifies the home network from other networks and a home network device can only communicate with other devices having the same home code. The control application 100 can set the home code by calling the following function
    int set_home_code( );
of the library 110.

Figure 5A:
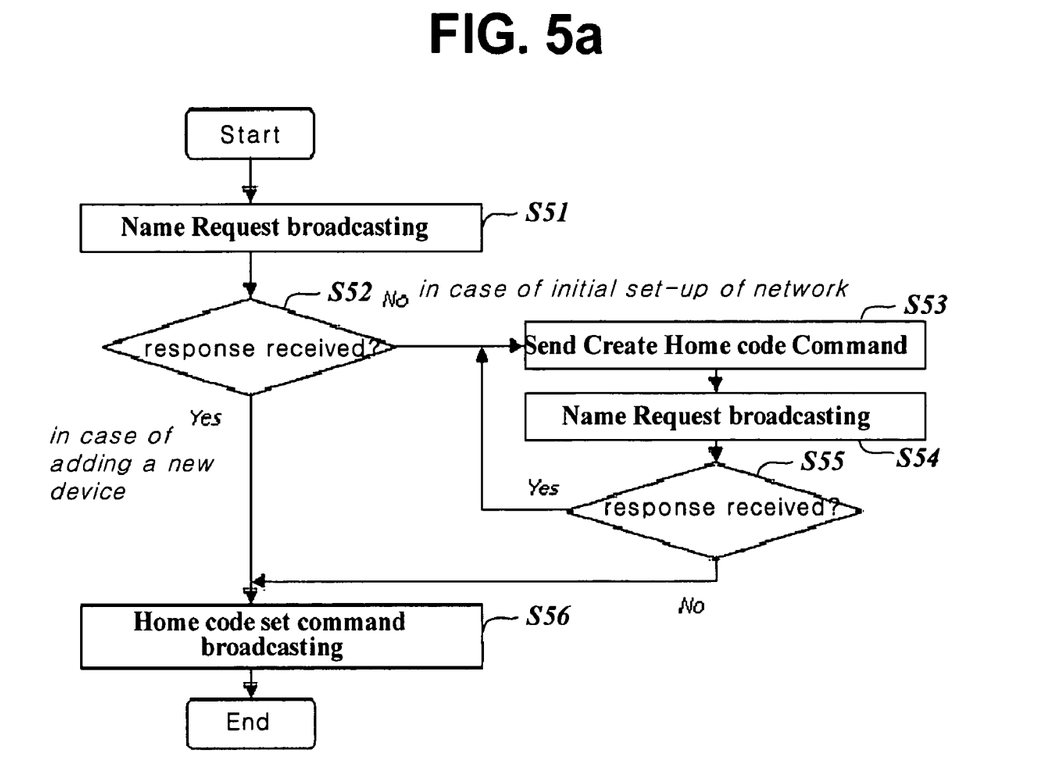
FIGS. 5a through 5c illustrates flow diagrams for the library to set a home code in each of the home network devices.

If the function set_home_code( ) is called, the library 110 executes the steps shown in FIG. 5a. The library 110 broadcasts a message that accompanies a response from devices (e.g., a message requesting the device name) through the physical network 200 (S51). The message uses the home code set in the network adaptor 100a. If there is a response to the message (S52) and the message is aimed to add a device to the network, the library 110 broadcasts another message for setting the home code (S56). If the message is not aimed to add a device in S52, the library 110 issues a command for generating a home code to the network adaptor 100a (e.g., power-line modem) (S53) (The home code generating command is issued by calling an internal function create_home_code( ) of the library 110) and then broadcasts another message that accompanies a response (e.g., a name requesting message) through the network again (S54). If there is a response to the message (S55), it indicates that the home code has been already used and therefore the library 110 performs the steps to generate a home code again (S53 and S54). If there is no response, the library 110 broadcasts a message for setting the created home code through the home network (S56).

As a result, even though a plurality of electronic appliances are connected to the home network through the power line, the electronic appliances can communicate with each other with no disturbance from external home networks due the home code uniquely assigned to the home network.

Figure 5B:
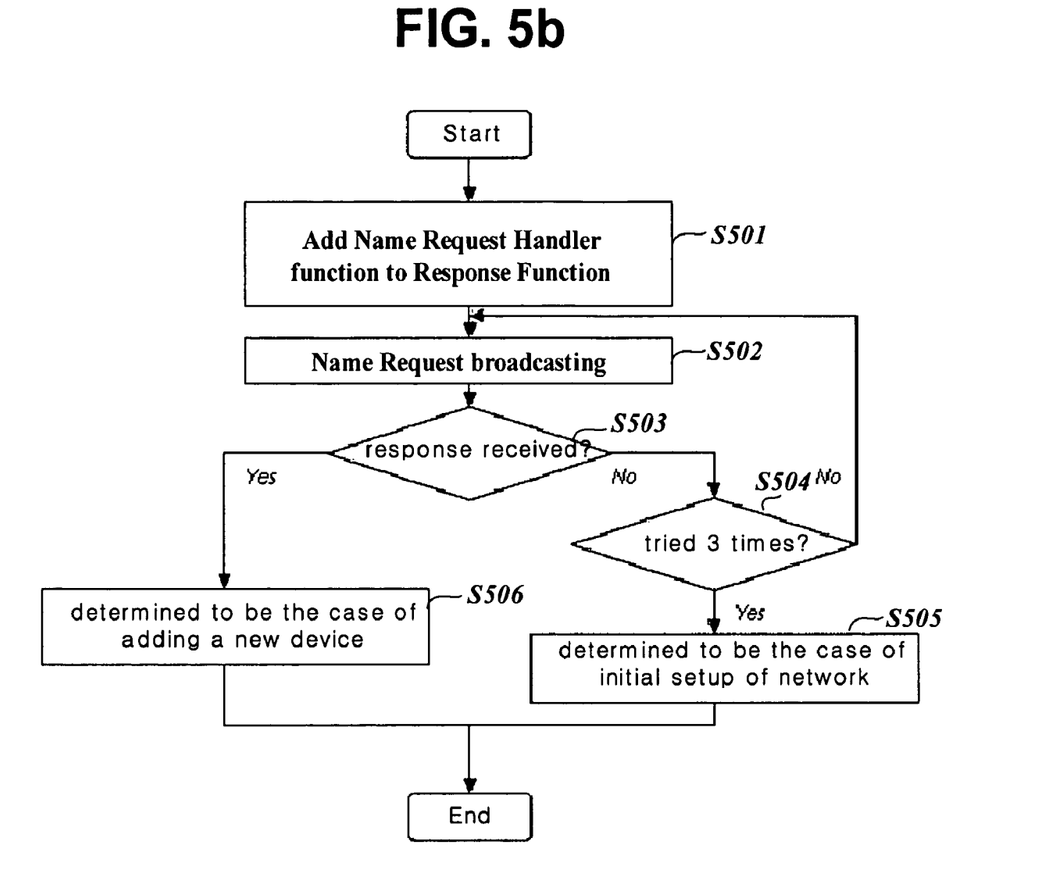

FIG. 5b is a flow diagram for determining if the home network is set up for the first time or a new device gets connected to the existing home network in the above procedure.

The method for setting the home code differs depending on whether the home network is set up for the first time or a new device gets added to an existing home network. If there is a response to the message for requesting the device name (S503 and S504), it is determined that a new device gets added to an existing home network (S506). If there is no response until the message is broadcast three times, for example, it is determined that the home network is set up for the first time (S505).

Figure 5C:
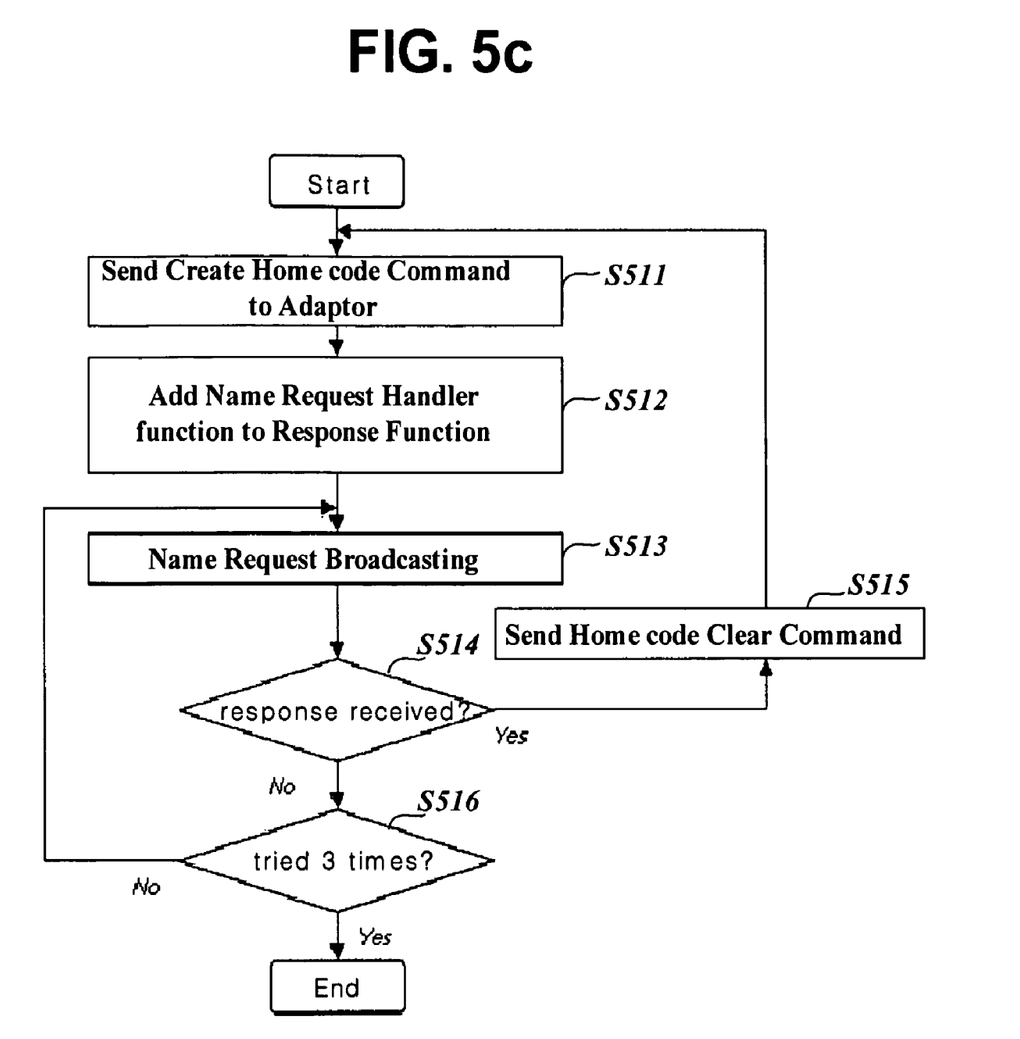

FIG. 5c is a flow diagram showing the steps S53 through S55 shown in FIG. 5a in more detail. In the case where a home network is installed for the first time, the present method according to this invention commands the network adaptor 100a (e.g., home network modem) to create a new home code (S511) and broadcasts the created home code so that modems for other home networks can set the home code after making sure that the created home code does not conflict with home codes of other home networks. The decision for determining whether there is a conflict with the created home code can be made by broadcasting a name requesting packet (S513). The handler for handling the response to the name requesting packet is registered in a table before the packet is broadcast (S512). If a response is received, the response is handled by the handler (S515).

If there is no response (S514), it is determined that there is no conflicting home code on the network. As described above, if there is no response until the message is broadcast three times, a message for setting the home code is broadcast (S56). If a response is received, it implies that the home code has already been used. The library 110, therefore, broadcasts a clear command to the modem to clear the created home code (S515) and commands the modem to generate a home code again (S511).

The function for clearing the home code is as follows:
    int clear_home_code( ).
This function clears the home code set in the home network modem by transmitting a command packet for clearing the home code to the home network modem connected to the master.

The above procedure for creating/clearing a home code is repeated until a unique home code is obtained.

In the case where a new device is added to an existing home network, the home code of the home network is broadcast so that the home code can be set in the home network modem of the new device (S56).

When setting the home code, it is also possible to set a user-defined home code manually to a network modem (e.g., powerline modem) instead of the home code that the network modem 100a generates in random. Registering a user-defined home code can be done by calling the following function
    int push_home_code(unsigned long home_code)
of the library 110.

If the function is called, the library 110 sets the received home_code, which is the input argument to the function, to a connected network modem (e.g., the modem 100a in case of the server). The home code set to the network modem is broadcasted via a message to every device on a home network by the aforementioned function set_home_code( ) if it is called. The home code broadcasted over the home network is set in modems (e.g., the network modems 301a and 302a) of the devices connected to the home network.

Each home network device needs a unique address for communication. The library 110 allows the control application 100 to assign addresses to the network devices easily by providing routines required for assigning/managing addresses.

Figure 6:
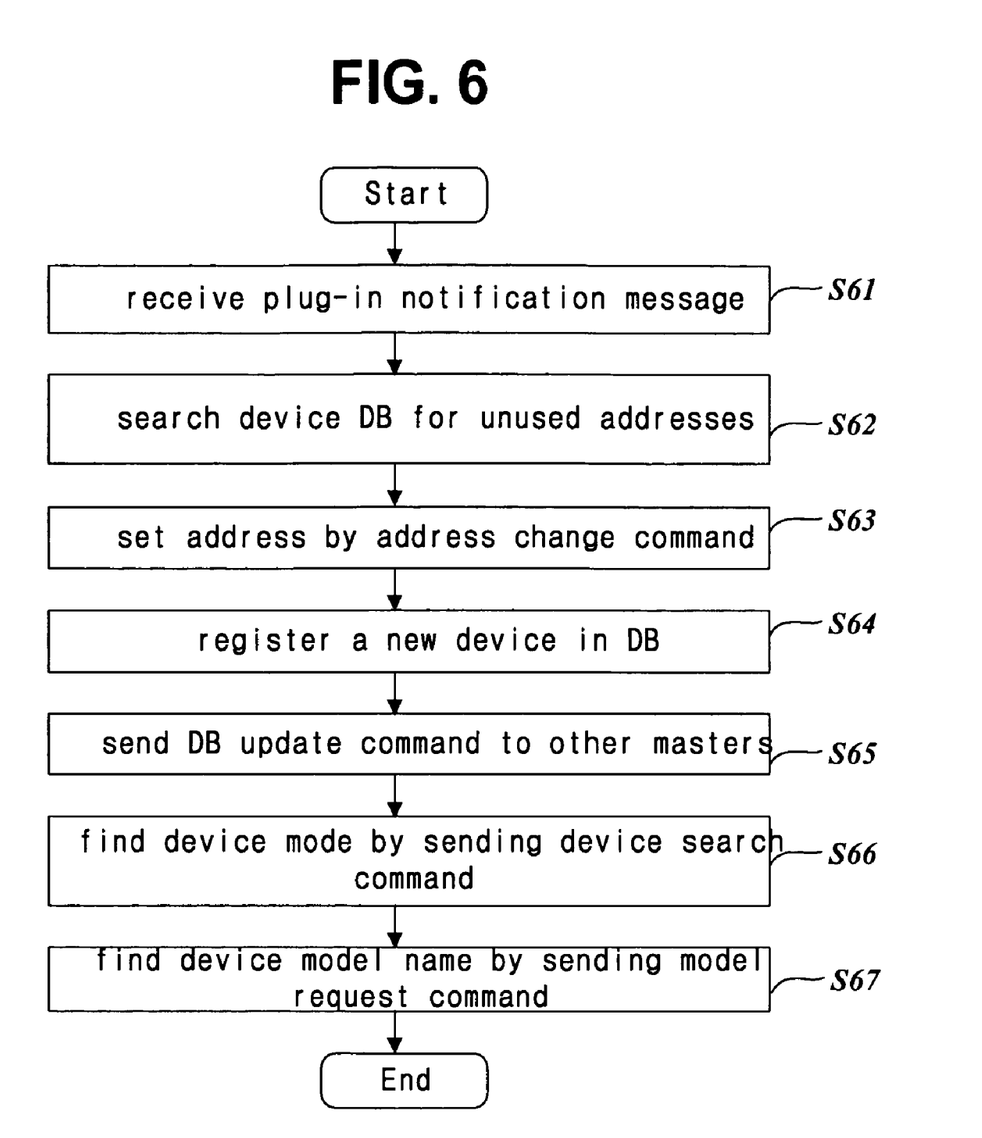
FIG. 6 illustrates a flow diagram for assigning address to a device on the home network.

A device which wants to join the home network broadcasts a plug-in notification message in order to obtain a unique address, (S61). A master that receives the plug-in notification message assigns an address to the device after processing the message.

To do this, the control application 100 registers a handler for the plug-in notification message in a response function hash table of the library 110 in advance. After the registration, the control application 100 can process the plug-in notification packet because the registered handler is called back by the library 110.

If a plug-in notification packet is received, the handler for the plug-in notification packet finds out the type of the device that transmits the packet and searches its database for an unused address based on the device type (S62). If an unused address is found, the handler passes the address via an argument to the address change command (S63). This procedure is conducted by calling the following function of the library 110:
    int change_address(old_addr, new_addr);
The arguments to function change_address( ) are the current address and a new address that will be used instead of the current address. If the device is a new device connected to the home network for the first time, 'old_addr' is a default address (e.g., usually 0). The function change_address( ) returns a value indicative of whether the address change operation is successful or not.

The device that receives the address change command sets the passed address as its address and transmits a response. If the function change_address( ) receives the response, the function stores the address in its database (S64) because it means that the address change operation is successful. In addition, the function sends a DB update command to inform other network managers that a new device is registered (S65).

After changing the device address, the library 110 makes requests for additional information to the device that sets the new address (S66 and S67) and stores the received information in the database. For example, the library 110 finds whether the device is a master or a slave by sending device search command (S66) and obtains the model name thereof using model request command (S67).

The method in which a master device sets up options of devices connected to the home network during initialization will now be described.

The library 110 of a master device of the home network should check which devices are connected to the network and which devices are active. To this end, the library 110 requests each of the devices to periodically send a message indicating that the device is active. The message is called "alive" message. When the control application 100 of the master initializes the network, the control application 100 notifies the period of "alive" message of the devices. The library 110 therefore knows which devices are active because it receives periodical "alive" messages from active devices.

A function of the library 110 which the control application 100 calls to set the period, inputted from a user or operator, of the "alive" message is defined as follows:

int set_alive_message_interval (time);

When the function is called, the library 110 passes the value of the variable 'time', which is the period of the "alive" message, to each of the devices on the home network so that the devices send the "alive" message periodically with the period afterwards.

It is possible to set current time in devices equipped with the function of keeping track of time. To set time in such devices, the control application 100 calls the following function     int set_clock (hour,min,sec);

of the library 110.

When the function is executed, the library 110 generates a packet containing the values of the variables 'hour', 'minute', and 'second' and transmits the packet to the devices. Also, the library 110 informs the control application 100 of the result via the return value based on responses from the devices.

The home network devices notify changes in the status to other devices and master devices through events. The control application 100 can enable or disable the status notification function through the library 110. To enable the status notification function, the control application 100 calls function defined as follows     int event_enable(enable);

of the library 110.

If the function event_enable( ) is called, the library 110 sends a command for enabling or disabling the status notification function to a corresponding device based on the input argument. Receiving a response to the command, the library 110 returns a value corresponding to the response to the control application 100.

If the interface between control applications and libraries is standardized, users can enjoy more freedom in purchasing electronic appliances for constructing a home network because compatibility is guaranteed for electronic appliances without regard to manufacturers thereof. The standardization also helps manufacturers reduce the cost for device development and warranty service.

While the invention has been disclosed with respect to a limited number of embodiments, those skilled in the art, having the benefit of this disclosure, will appreciate numerous modifications and variations therefrom. It is intended that all such modifications and variations fall within the spirit and scope of the invention.

What is claimed is:

1. A method in which an application operates in a device for managing a network of remote devices, the method comprising:

initializing a library in the device in response to a request from the application, wherein the library is for modifying and monitoring or controlling remote devices connected to the network, wherein the modifying comprises at least removing the remote devices or adding new remote devices;

obtaining, from the library in response to a request from the application, a list of the remote devices connected to the network and information related to the remote devices;

registering, at the library in response to a request from the application, an event that is generated by at least one of the remote devices, wherein the registered event corresponds to one of a plurality of event codes;

registering, at the library in response to a request from the application, a first call-back function to handle only one of the plurality of event codes that relates to one of the remote devices and a second call-back function to handle every one of the plurality of event codes that relates to every one of the remote devices; and calling the registered first or second call-back functions whose routines are included in the application when the registered event is generated.

2. The method of claim 1, further comprising:

loading a user interface program at the application before requesting initialization of the library.

3. The method of claim 1, wherein initializing the library comprises delivering basic information to the library for controlling the remote devices.

4. The method of claim 1, further comprising:

releasing the registered event and one of the first and second call-back functions in response to a request from the application.

5. The method of claim 1, wherein adding the new remote devices comprises:

broadcasting a request for adding a new remote device to the network; and receiving a response to the broadcasted request from one of the new remote devices.

6. The method of claim 1, wherein adding the new remote devices comprises:

receiving a new event from a new remote device, wherein the new event indicates a request for adding the new remote device to the network; and calling one of the first call back function or the second call back function to handle the received new event.

\* \* \* \* \*